US006311833B1

United States Patent
Collier

(10) Patent No.: US 6,311,833 B1
(45) Date of Patent: Nov. 6, 2001

(54) CONTACT LENS CARE CENTER

(76) Inventor: Judy Ann Collier, 260 Guntersville Rd., Arab, AL (US) 36016-1127

(*) Notice: Subject to any disclaimer, the term of this patent is extended or adjusted under 35 U.S.C. 154(b) by 0 days.

(21) Appl. No.: 09/775,521

(22) Filed: Feb. 5, 2001

(51) Int. Cl.$^7$ .................................................. B65D 69/00
(52) U.S. Cl. ..................... 206/229; 206/5.1; 220/592.18; 220/528
(58) Field of Search ...................... 206/581, 823, 206/229, 5.1, 216; 220/592.18, 592.19, 521, 523, 528, 529

(56) References Cited

U.S. PATENT DOCUMENTS

| | | | | |
|---|---|---|---|---|
| 3,394,717 | * | 7/1968 | Hollinger | 206/5.1 |
| 4,321,998 | * | 3/1982 | Van de Walker et al. | 206/229 |
| 4,691,725 | * | 9/1987 | Parisi | 206/5.1 |
| 5,027,972 | * | 7/1991 | Bartholomew | 220/526 |
| 5,286,106 | * | 2/1994 | Burgos | 222/235 |
| 5,368,387 | * | 11/1994 | Creighton et al. | 366/194 |
| 5,437,165 | * | 8/1995 | White et al. | 62/265 |
| 5,439,104 | * | 8/1995 | Wolska-klis | 206/233 |
| 5,564,597 | * | 10/1996 | Koorse et al. | 221/96 |
| 5,775,591 | * | 7/1998 | Fauci | 239/304 |
| 5,784,087 | * | 7/1998 | Wallace et al. | 222/207 |
| 5,803,244 | * | 9/1998 | Shefler et al. | 206/6 |
| 6,269,965 | * | 8/2001 | White et al. | 220/592.18 |

* cited by examiner

Primary Examiner—Shian Luong

(57) ABSTRACT

Contact lens cleaning and conditioning liquids, dispensers and a lens storage case are consolidated and arranged in a common unit with features for effectively maintaining contact lens from a single functional package. A molded plastic enclosure accommodates and positions containers of cleaner and conditioner in a manner that allows liquid transfer into lens case compartments without repeated handling of individual bottles. The enclosure provides a single structure that replaces multiple bottles and lens cases that ordinarily occupy counter top space. The enclosure also provides protection for the contact care products and devices when the unit is transported.

2 Claims, 1 Drawing Sheet

CONTACT LENS CARE CENTER

CROSS REFERENCE TO RELATED APPLICATIONS

None specifically identified.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

The present invention relates to a structure designed to consolidate and arrange contact lens care products and devices into a single functional package.

Cleaning and conditioning products marketed to care for contact lenses generally come in individual containers. Typically the liquid solutions come in squeezable bottles from which the user can dispense the fluid into the contact lens case chamber used to hold the individual lens. Each of the containers must be handled separately to dispense the liquids when maintaining the lens. In ordinary household conditions the number of containers will many times occupy limited countertop space. While the use of individual containers provides the user all of the necessary care items, it results in inefficiency that this invention will minimize. The invention provides an effective way to manage and reduce the number of different containers currently used by persons wearing non-disposable contacts.

BRIEF SUMMARY OF THE INVENTION

The primary objective of this invention is to consolidate in one package all necessary cleaning, moistening, and saline liquids and the requisite storage and transport case needed for care of contact lens. This invention is generally construed as a package suited for household use on a vanity or counter top.

The invention consists of a molded plastic container having three structural components with appropriate liquid containers, dispensers and a lens case. The base component will have a cavity on each end to hold containers for the cleaning and conditioning fluids and one central cavity to store extra lens cases or other small items. The invention has an inner lid component to retain the bottles in the base when the liquid container caps or dispenser pumps are attached. The base and inner lid components interlock with each other in a manner that fastens them together yet allows separation for access to the base cavities. A molded feature to retain the contact lens case is located on the top center of the lid. The spacing and arrangement will allow the pump type dispensers to direct the fluids into each compartment of the contact lens case. A top cover component encloses and protects the functional devices when not in use. The top cover and inner lid components also interlock similar to the base and inner lid components to provide a protective enclosure for the functional components.

A further objective of this invention is to provide an improved means of transporting contact lens care products when in a transient mode. This invention will provide a structurally simple package in which essential contact lens care products are consolidated and protected by the enclosure. The invention will be especially useful for transporting necessary contact care products in a single package rather than multiple individual items. The closed case can be carried in a variety of bags without significant risk of damage or leakage. This invention will allow athletes, travelers and others to maintain their contact lens efficiently in a variety of conditions from one consolidated package of care products.

BRIEF DESCRIPTION OF THE DRAWING

Referring to FIGS. 1 and 2, the embodiment of the invention as designated generally by reference characters 1, 4 and 7, is shown with the basic contact care product containers and lens cases in place.

Figure 1:
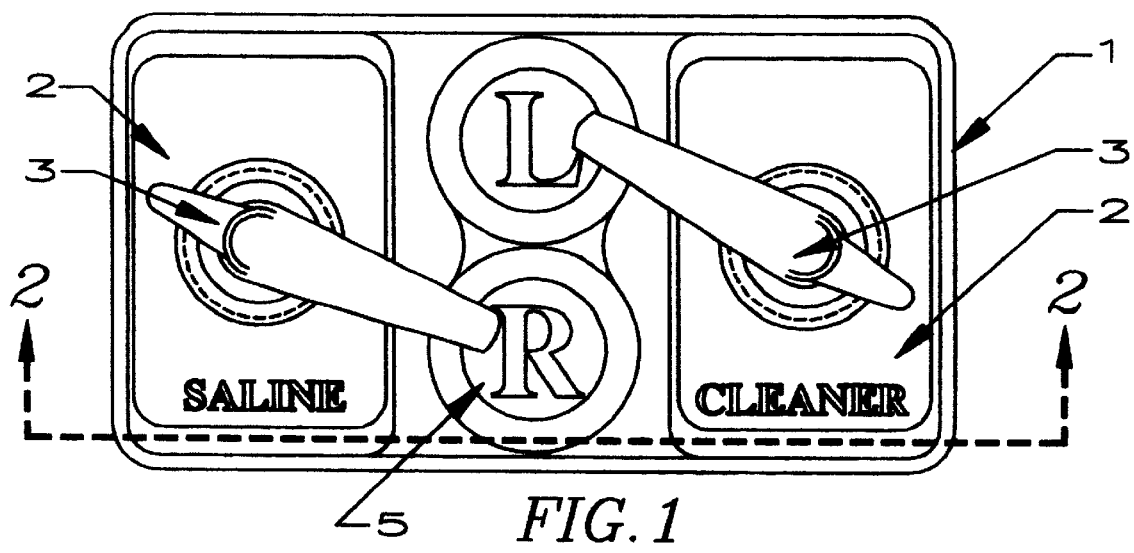
FIG. 1 is a top view of the rigid case design with the outer lid removed. This view shows the main elements of the invention.
Figure 2:
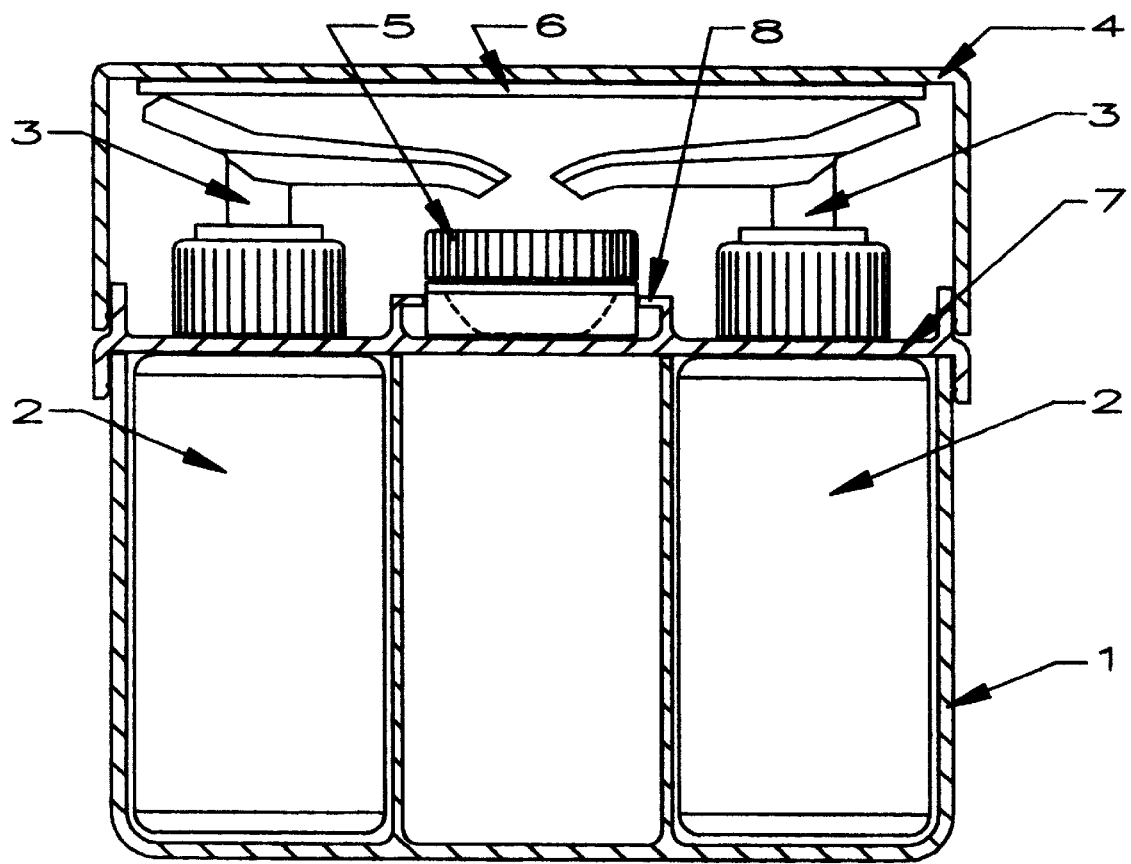
FIG. 2 is a sectional view of the rigid case design showing the invention components and content arrangement.

The invention is comprised of a molded plastic base component 1, a molded plastic inner lid 7, and a molded plastic top cover 4 together with appropriate liquid containers 2, dispensers 3 and a lens case 5 arranged and consolidated into a functional package. The base component 1 has three cavities. Two of the cavities are designed to encase molded plastic containers 2 holding contact lens cleaner and conditioning liquids. The necks of these containers 2 extend through the inner lid 7 and are restrained when container caps or dispenser pumps 3 are threaded onto the container. The space between the container cavities can be used as storage for incidental contact care items.

The invention has two removable components. An inner lid 7 will be in place when the invention is in use. This molded plastic inner lid 7 covers the base component 1 to enclose and restrain the liquid containers 2 when transferring liquids. This lid also provides a retaining feature 8 to hold a lens storage case 5 between the liquid containers 2. The liquid containers 2 will be equipped with pump type dispensers 3 configured to transfer the liquids into the lens case 5 from either bottle. The arrangement of the design, as depicted in the drawing, is such that the lens case compartments are under the movable discharge opening of each transfer dispenser 3. The lens case 5 can be removed from its retained position on the inner lid 7 for emptying, cleaning or carrying separately.

The top cover 4 will enclose the functional elements of the invention while not in use. This cover may contain a mirror 6 in the outer lid for user convenience. The cover will also provide protection for the functional items when the invention is transported in carrying bags of various types.

The interlocking features of the base 1, inner lid 7 and top cover 4 components consist of small projections along each wall that interlock with similar size features on the interfacing components. The resilient plastic walls of the components will deform slightly when these components are pressed together allowing the interlocking features to engage.

The foregoing description should be considered illustrative of the principles of the invention. Specific construction and operational changes may be defined by those skilled in related techniques. Accordingly, it is not desired to limit the invention to the exact construction and operation described herein and all suitable modifications or equivalent changes may be made within the scope of the invention.

I claim:

1. In combination, a structural enclosure and existing fluid containers, dispenser assemblies, and contact lens case, said combination consisting of a base structural component of rectangular box shape including a flat bottom, separated by partitions to form a cavity on each end to hold a fluid container with a dispenser assembly; and an inner lid structural component shaped to interlock with the base component with holes to fit over the neck portion of fluid containers and under the installed dispensers and including features to retain a removable contact lens case located on the top center; and a top cover structural component shaped to interlock with the inner lid component.

2. A contact lens care center as claimed in claim 1, wherein said top cover component contains a mirror.

* * * * *